United States Patent [19]
Long et al.

[11] Patent Number: 6,098,000
[45] Date of Patent: Aug. 1, 2000

[54] INTERACTIVE, INDIVIDUALLY CONTROLLED, MULTIPLE BLADDER SEATING COMFORT ADJUSTMENT SYSTEM AND METHOD

[75] Inventors: Bruce T. Long, Hampstead, N.H.; Jeffrey I. Finkelstein, Shelburne, Vt.; Anthony R. Haba, II, Stratham; Donna L. Lizotte, Kensington, both of N.H.; Alfred E. Bissell, III, Boxford, Mass.; Carl F. Kackenmeister, Stratham; Steven Castrigno, Somersworth, both of N.H.; Tuan A. Dam, Cambridge, Mass.; David A Gattuso, Deerfield; Babak Sardashti, Windham, both of N.H.

[73] Assignee: McCord Winn Textron Inc., Manchester, N.H.

[21] Appl. No.: 08/808,511

[22] Filed: Feb. 27, 1997

Related U.S. Application Data

[63] Continuation-in-part of application No. 08/664,809, Jun. 27, 1996, abandoned, which is a continuation of application No. 08/265,437, Jun. 24, 1994, abandoned.

[51] Int. Cl.[7] .............................. B60N 2/02; A47C 27/10; A47C 7/14
[52] U.S. Cl. .......................... 701/49; 297/284.6; 307/10.6
[58] Field of Search ........................... 701/49; 297/284.1, 297/284.4, 284.6, 330; 307/10.1, 10.6; 340/438; 180/268, 282

[56] References Cited

U.S. PATENT DOCUMENTS

| | | | |
|---|---|---|---|
| 4,634,083 | 1/1987 | McKinnon | 244/122 R |
| 4,634,179 | 1/1987 | Hashimoto et al. | 297/284.6 |
| 4,655,505 | 4/1987 | Kashiwamura et al. | 297/284.6 |
| 4,707,027 | 11/1987 | Horvath et al. | 297/284.6 |
| 4,722,550 | 2/1988 | Imaoka et al. | 280/727 |
| 4,807,931 | 2/1989 | Ishida et al. | 297/284.6 |
| 4,833,614 | 5/1989 | Saitoh et al. | 701/49 |
| 4,915,124 | 4/1990 | Sember, III | 137/223 |
| 5,137,329 | 8/1992 | Neale | 297/284.6 |
| 5,263,765 | 11/1993 | Nagashima et al. | 297/284.6 |
| 5,283,735 | 2/1994 | Gross et al. | 600/587 |
| 5,345,629 | 9/1994 | Ferrand | 5/710 |
| 5,373,595 | 12/1994 | Johnson et al. | 5/710 |

*Primary Examiner*—William A. Cuchlinski, Jr.
*Assistant Examiner*—Ed Pipala
*Attorney, Agent, or Firm*—Reising, Ethington, Barnes, Kisselle, Learman & McCulloch, P.C.

[57] ABSTRACT

A system of inflatable air cells is constructed and installed in a seat at locations that are strategic to the comfort of the user. The air cells are connected to a pump through a manifold which sequentially connects each cell independently to the pump. The manifold controls the flow of fluid in the air cell distribution system by means of a system of valves and senses the pressure in each cell by means of a transducer. A microcomputer is programmed with data representing a desired comfort level for each of the air cells. By sequentially activating individual manifold valves, a pressure signal from the transducer can be generated for each cell. The pressure signals are received by the microcomputer and are correlated with the predetermined comfort data to generate a control signal which activates the pump. In this manner each of the cells can be individually inflated or deflated to the desired pressure level. By varying the number and location of the cells the system becomes responsive to the localized pressures exerted on the body for a great variety of users.

25 Claims, 8 Drawing Sheets

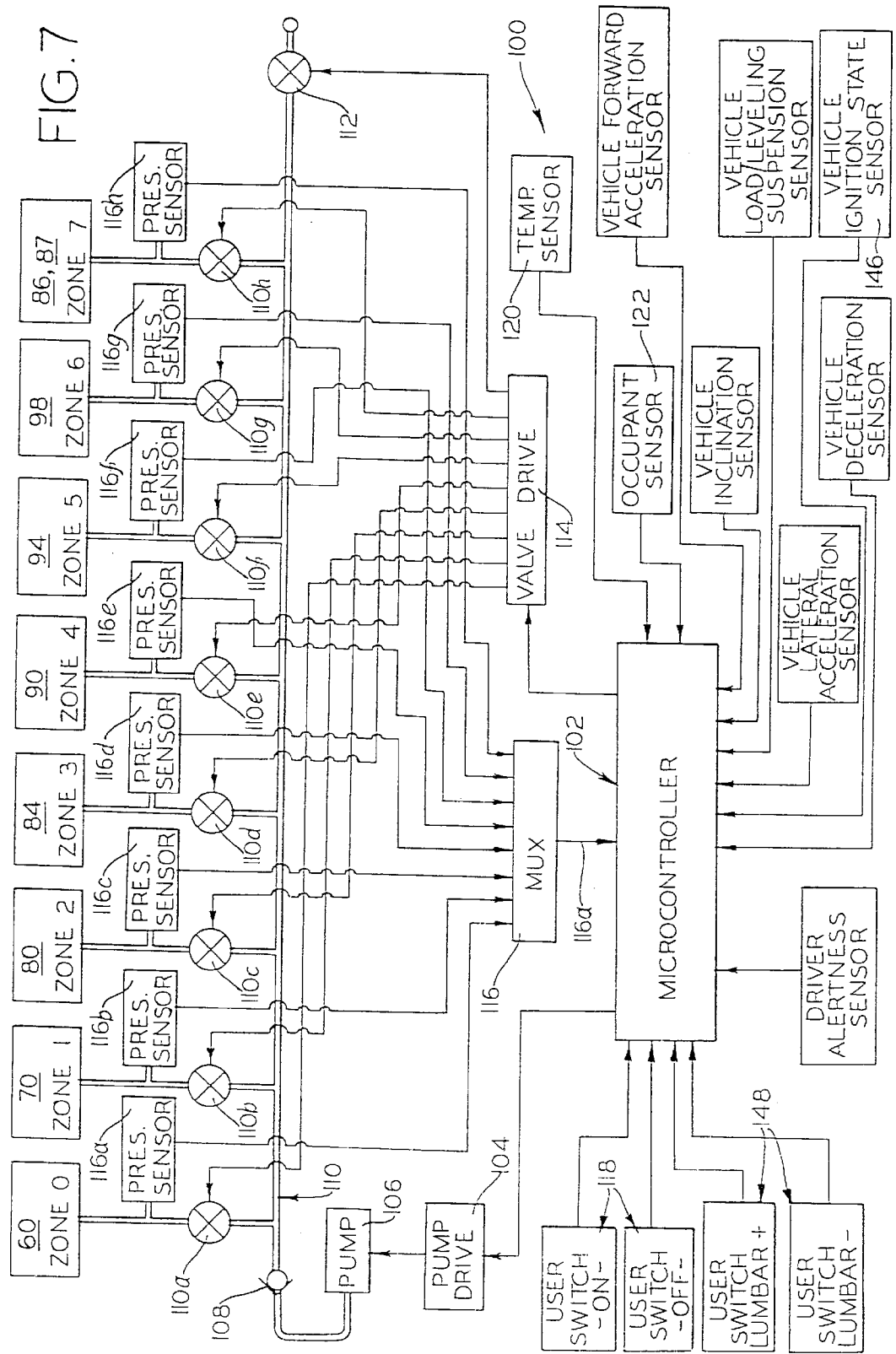

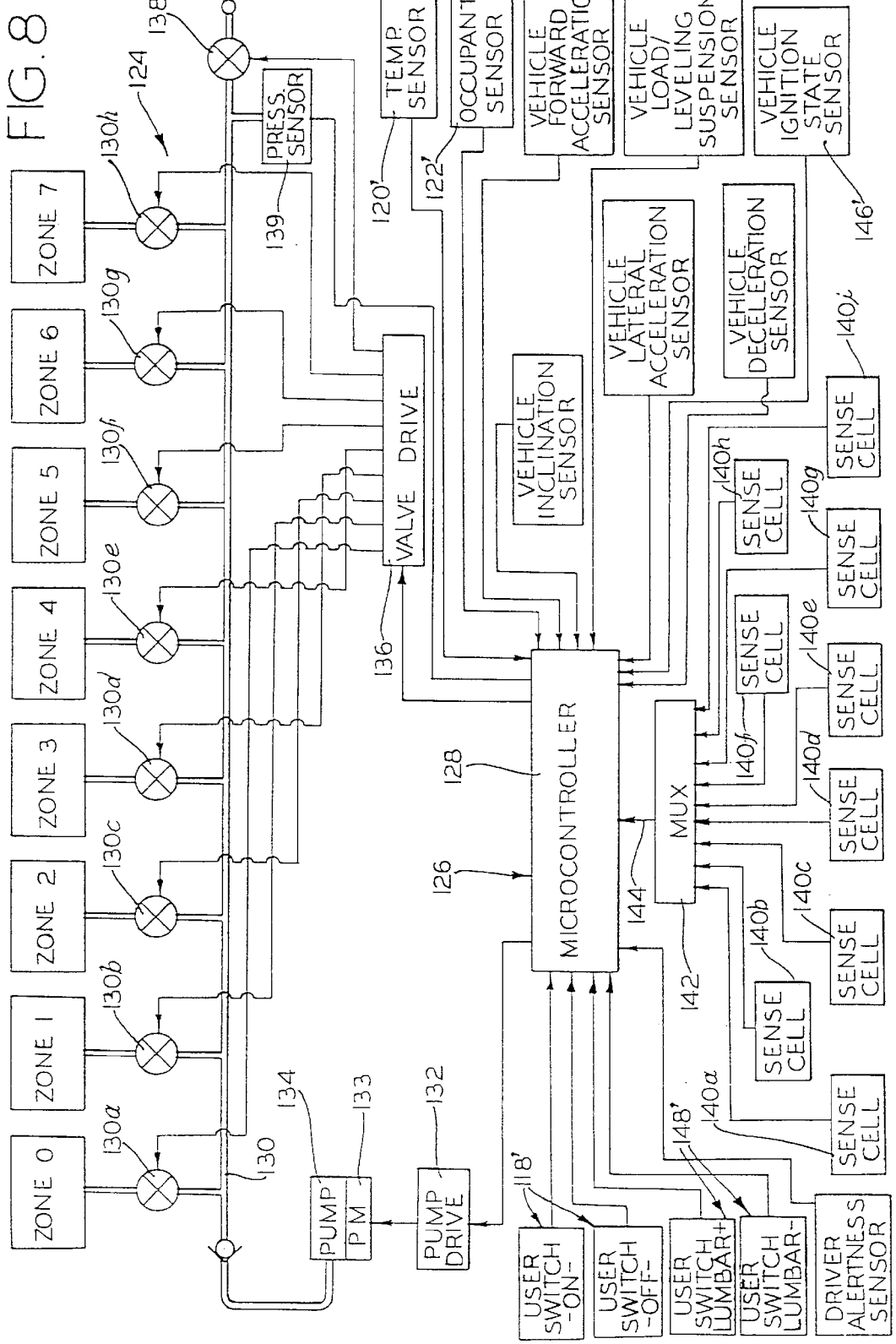

INTERACTIVE, INDIVIDUALLY CONTROLLED, MULTIPLE BLADDER SEATING COMFORT ADJUSTMENT SYSTEM AND METHOD

This is a continuation-in-part application of U.S. patent application Ser. No. 08/664,809 filed Jun. 27, 1996 now abandoned, which is a continuation of U.S. patent application Ser. No. 08/265,437 filed Jun. 24, 1994 now abandoned.

BACKGROUND OF THE INVENTION

Inflatable air cells have been used in a variety of configurations to provide adjustments to the contour of a seat and in this manner enhance the comfort of the individual using the seat. This is especially important in automobiles where long periods of driving can cause pain and distraction or in other seating applications where individuals are sedentary for long periods of time.

The seating system described in U.S. Pat. No. 4,915,124 involves a simple system of multiple air cells in which each cell is connected through a valve to a source of pressurized air in a manner which allows for simultaneous inflation or deflation of the cells in response to a manually operated switch.

Another air cell inflation system is shown in U.S. Pat. No. 5,263,765. This device inflates the air cells according to two predetermined modes, through tubes individually controlled by valves which are in turn controlled by a microcomputer. The microcomputer is responsive to the fatigue of the driver as represented by seat belt displacement.

The air cells of U.S. Pat. No. 4,722,550 are adjusted in response to engine speed or steering angle and allows for selective inflation between two zones of air cells, one at the sides and one for the bottom and back of the seat. One valve controls each of the zones and is actuated by a microcomputer which receives sensed signals relative to the operating parameters of the automobile.

A manually operated power control system for a lumbar cushion is described in U.S. Pat. No. 4,707,027. A complex seating mechanism is devised to allow the operator to inflate and deflate the cushion while sensing pressure in the cushion to limit actuation of the system to prevent damage.

U.S. Pat. No. 4,833,614 shows a system by which an air cell can be inflated to a selected pressure by sensing the actual pressure, comparing it to the pressure selected and then adjusting the air supply to inflate or deflate the air cell to the selected pressure. In this case the microcomputer converts the pressure signal it receives to a time based signal relative to the period necessary to run the pump to obtain the selected pressure. The pressure is sensed directly from sensors within the air support.

The above systems are limited either to narrow preset operational boundaries or rely on the operator to provide a manual interactive response. Although each attempts to improve the comfort of the user and adjust in some manner to the variety of shapes and sizes of the user, each falls short because of the inherent limitations in the particular system.

Inflatable air cells have been used as a means to actuate adjustment mechanisms for altering the contour of a seat for many years. This adjustment is desirable to customize the seat contour to a particular user. In applications such as automobile seating where fatigue may become a factor, it is of particular interest to provide adjustment from user to user and during use by an individual. Air cells have also been used to adjust the tactile support for such critical regions as the lumbar portion of the back which is particularly susceptible to fatigue. In this instance the air cell provides direct support and not just an adjustment mechanism.

An air cell adjustment mechanism of the prior art is shown in U.S. Pat. No. 5,137,329. This patent describes a support structure consisting of front and back plates between which are sandwiched two air cells. The air cells may be selectively inflated and deflated to provide pivoting adjustment motion to the front plate which provides the support contour for the seat.

Tactile adjustment is provided by the air cell of U.S. Pat. No. 4,807,931 which is also mounted in a seat to provide the support contour for directly engaging the lumbar region of the user's back.

U.S. Pat. No. 4,655,505, assigned to NHK Spring Co. Ltd., discloses a pneumatically controlled seat for a vehicle that has a mechanism which can sense the pressure in each air cell remotely in a manifold using one sensor. However, the prior art does not show multiple low power, low fluid resistant valves nor provide automatic adjustment responsive to the user's comfort. The system of this invention accomplishes all of the objects of the prior art while providing many combinations of modes of operation from fully automatic to manual.

SUMMARY OF THE INVENTION

A system of inflatable air cells is constructed and installed in a seat at locations which are strategic to the comfort of the user. The air cells are connected to a pump through a manifold which simultaneously or sequentially, as desired, connects each cell to the pump. The manifold controls the flow of fluid in the air cell distribution system by means of a system of valves and senses the pressure in each cell by means of one or more transducers. A microcomputer's non-volatile memory is programmed with data representing a desired comfort level for each of the air cells. By sequentially activating individual manifold valves, a pressure signal from the transducer can be generated for each cell. The pressure signals are received by the microcomputer and are compared with the predetermined comfort data to generate a control signal which activates the pump or opens the exhaust valve. In a preferred embodiment, proportional control is used to regulate pressure in any air zone. The cells can be individually inflated or deflated to the desired pressure level. By varying the number and location of the cells the system becomes responsive to the localized pressures exerted on the body for a great variety of uses.

One purpose of this invention is to provide a pneumatically controlled seat surface for a vehicle having an array of air cells, each connected to a source of pressurized fluid (air), and arranged in a manner to operate both as an adjustment mechanism for the lumbar support of a seat contour and as an adjustable tactile support contour as well. A fluid distribution system is associated with the array of air cells to provide a simple method of adjusting the lumbar region of a seat to the satisfaction of the user without complex mechanics and while allowing multiple adjustment motions.

Another purpose of this invention is to provide a pneumatically controlled seat for a vehicle having a multiple air cell inflation system which can adjust the pressure in each of the cells simultaneously or sequentially, as desired, in accordance with sensed parameters which can be compared to a predetermined comfort level and operatively to individually inflate or deflate the cells to a desired or computed pressure level. This is accomplished in a manner which minimizes weight, cost, and complexity while maximizing flexibility, reliability, and above all seating comfort.

One feature of the present invention is to provide the system of the preceding object wherein a microcomputer control is provided for user inflation or deflation of the pressure in one or more of the cells to adjust lumbar firmness and thereafter sensing the pressure by a transducer and storing the adjusted pressure condition in the microcomputer to provide a new pressure target that up-dates the comfort data by changing a target pressure for one or more of the cells.

Another feature of the present invention is to provide a control system for such pneumatically controlled seats having a single pressure sensor and a microcomputer that is programmed to automatically exhaust or fill an air cell to correct for pressure changes produced by occupant movement or to compensate for small leaks in order to maintain a desired target pressure within one or more of the air cells even as environmental factors change (e.g., temperature).

Still another feature of the present invention is to provide a single pressure sensor and microcomputer for such pneumatically controlled seats that detect a signature of occupant movement produced by wiggling movements of an occupant and to adjust the system in response to such signature to recycle the system to assure that initial target pressures are present therein.

Yet another feature of the present invention is to provide a sensor and microcomputer as set forth above that is operative in response to multiple input signals including one or more of an occupant detection condition; a temperature condition; system power-up; on-off switch and a system override switch.

Still another feature of the present invention is to provide a microcomputer in the aforesaid systems in which the controller is programmed to operate multiple valves and a pump to conduct an initial inflate of the system cells to a gross pressure level with all of the valves initially open followed by continuous pressure reads and a sequential closure of each pressure zone formed by one or more cells as the pressure therein is compared by operation of the microcomputer to a desired target pressure.

A further object of the present invention is to provide a microcomputer control of the preceding object wherein the sequential control of each cell is either by a pressure pump inflation or by an exhaust valve deflation.

A still further object of the present invention is to provide for such a pressure inflation or exhaust deflation by establishing a pressure $\epsilon$ (or error range) range for the target pressure and to conduct only a select number of trial adjustments before terminating a correction sequence for establishing a desired target pressure condition within an air cell.

Still another feature of the present invention is to provide a microcomputer in the aforesaid systems that conditions the system to open all the cells to atmosphere when a seat is not occupied.

Another feature of the present invention is to provide a microcomputer in the aforesaid systems in which the microcomputer is programmed to produce a pulse width modulation of the drive motor for a pressurization pump and wherein the duty cycle of the drive motor energization is regulated in accordance with the number of open control valves, thereby controlling the inflation pressure and flow.

Still another feature of the present invention is to provide a microcomputer in the aforesaid systems in which an initial occupant assessment is made and inputted to the microcomputer and utilized to establish the target pressures in a look-up table for use in the comfort control operation of the system.

Still another feature of the present invention is to provide a microcomputer in the aforesaid systems in which an initial occupant assessment is made and inputted to the microcomputer and utilized to establish the position of motor driven vehicle mirrors; motor driven operating pedals; motor driven seat frames and motor driven steering wheels.

Yet another feature of the present invention is to provide a system having pressure controlled cells on a seat pan having fore and aft adjustment and to control the seat pan position in accordance with pressures produced in the cells during initial occupant assessment.

BRIEF DESCRIPTION OF THE DRAWINGS

FIG. 7 is a view of a pressure supply system for the embodiment of FIG. 6;

FIG. 8 is a view of another embodiment of a pressure supply system for the embodiment of FIG. 6.

DESCRIPTION OF THE PREFERRED EMBODIMENTS

The Seat

Figure 1:
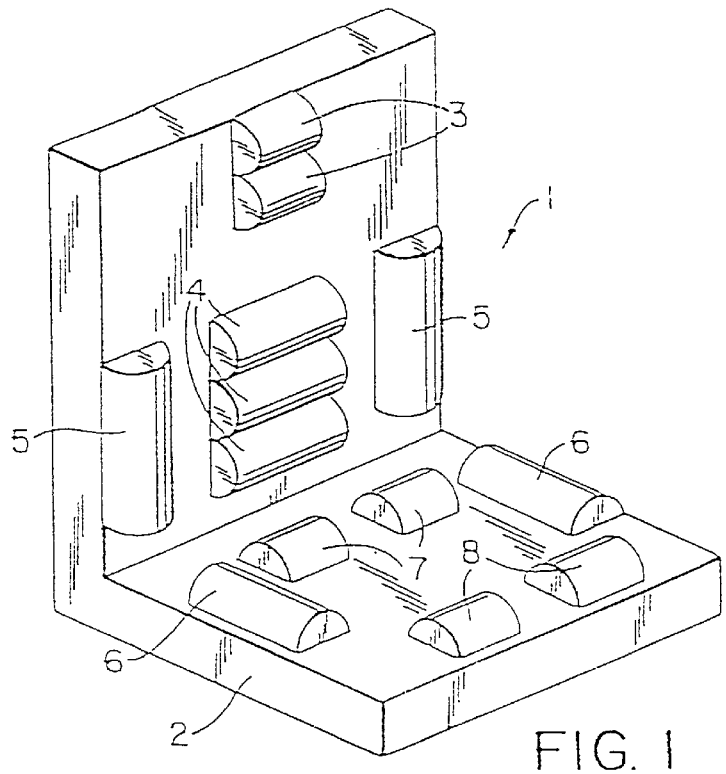
FIG. 1 is a diagram of the air cell arrangement of this invention.
Figure 4:
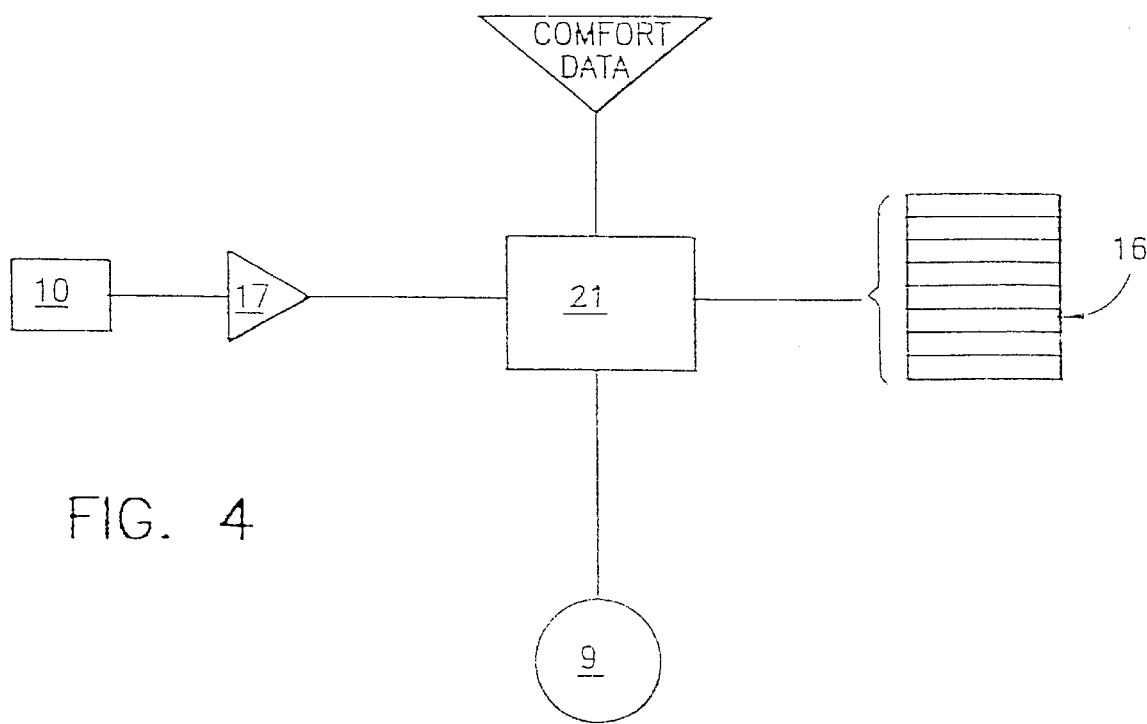
FIG. 4 is a chart depicting the flow of information amongst the components of the system of this invention.
Figure 2:
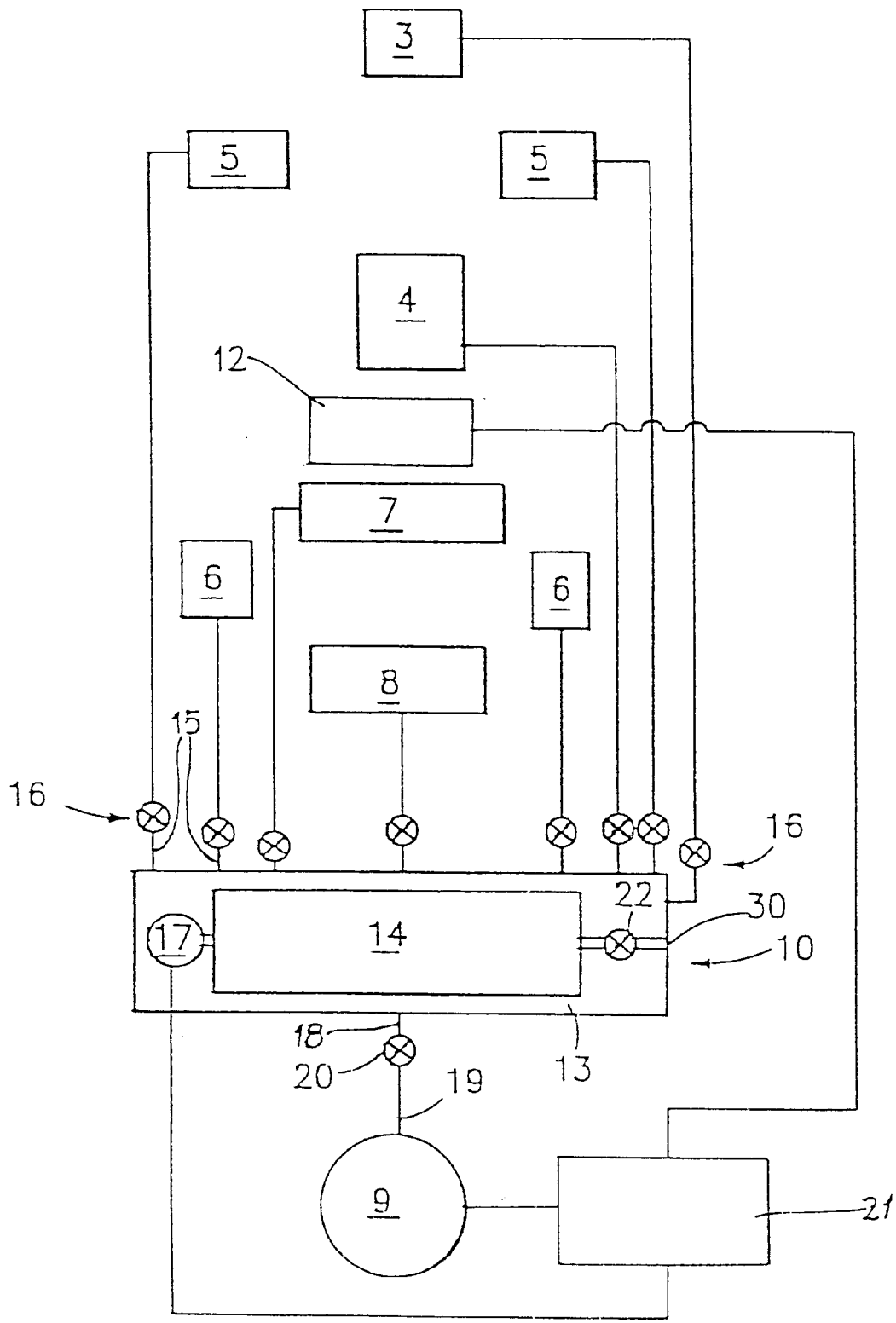
FIG. 2 is a schematic diagram of the fluid distribution system of this invention.

A series of air cells or bladders 1 are placed at strategic locations about the contour of an automotive seat 2 as shown in FIG. 1. The air cell placement is selected to coincide with key pressure points on the body to enhance the ability to respond to the comfort needs of the user. In particular, a pair of cells 3 are positioned in the thoracic region while three cells 4 are combined in the lumbar region. To further facilitate the adjustability of the seat, pairs of cells 5, 6, 7 and 8 are positioned at either side of the back and seat as well as the front and back of the thighs respectively. Each of these cells is in direct contact with the body to provide the control system with information which may be related to the comfort of the user. The cells are connected to a source of pressurized fluid 9 through a manifold 10 as shown in FIG. 2. The manifold 10 and pump 9 are controlled by a microcomputer 21 in response to information stored in the microcomputer which is compared to data provided by a sensor 12.

Each individual cell is constructed of a suitable flexible material such as rubber, polyurethane coated fabric or any other material provided with a fluid tight connection to the manifold to provide a path for conducting fluid into and out of the cell. The cells may be connected individually to the manifold or jointly with other cells. While three cells 4 are shown at the lumbar region and multiple cells are shown on the seat, the invention also contemplates use of a pressurizable mat in place thereof.

The Manifold

The manifold 10 consists of a housing 13 enclosing a chamber 14 constructed with multiple outlet ports 15 for connecting the chamber 14 to the inlet/outlet tubes of each individual cell or regional group of cells. Each outlet port 15 is provided with an outlet valve 16 for controlling the flow of fluid to and from the air cells. In this embodiment, the sensor is a pressure sensing transducer 17 that is operatively connected in the manifold to sense the pressure in the manifold chamber 14 and generate a signal indicative thereof. Chamber 14 is also constructed with a single inlet port 18 which is connected to a feed tube 19 to receive pressurized fluid, in this case air, from pump 9. A supply valve 20 is provided in feed tube 19 to control the flow of pressurized fluid to the manifold. The manifold can be molded of a high strength plastic material or other suitable material. The plastic material arrangement can have many of its components integrally molded therein. It is preferred that it be as compact and light weight as possible. However, the invention can be configured with other than light weight components and other than with integral components. A common bleed or exhaust valve 22 is provided to selectively release pressure from the manifold chamber 14 through venting port 30. The pressure in chamber 14 can therefore be adjusted by either actuating pump 9 or bleed valve 22.

Valves 16 are actuatable by an electrical signal and are designed for low power, low fluid resistant operation. More specifically valve 16 is an adaptation of highly efficient valves used in medical applications and comprises a two stage piezoelectric actuated valve in which a pilot valve acts to expose the main valve to its operable pressure. The bodies and valve seats of this design are easily moldable and can be integral with the manifold or within a valve module. Individual valve bodies can be designed for stacking assembly to form the manifold of this invention. In addition to a piezoelectric actuated valve 16 other low energy actuatable valves are contemplated by the present invention including but not limited to electrically pulsed reed valves; valves having an actuator configured of nickel titanium alloy such as Nitinol; magnetic inductive type valves or fluidic control valves so long as low energy consumption will operate the valve in on-off positions in which the flow from an inlet to outlet will satisfy the flow requirements of the pressure adjusted air cells in a given electropneumatic system for controlling a seating surface such as a seat, chair or bed to provide contouring, movement, support and/or comfort at a user interface. The importance of the use of such a valve arrangement in the present invention is that, in the past, pressure adjusted systems have utilized solenoid actuated valves to open and close an air cell to a pressure source for inflating the air cell or to a relief path for deflating the air cell. In such applications, power consumption is a problem since the major power consumers in the system combine power flow for operation of a motor driven pump and the power flow for operating the solenoids connected to the mechanical valving components. In one working embodiment, nine (9) valves are required to control flow to the eight air zones shown in the embodiment of FIG. 6 and to one exhaust. Depending on the type of pump, power consumption can be as little as 6 watts or as much as 72 watts during normal operation. Added to this power consumption, in the case of solenoid controlled valves, is an additional power draw on the order of 1 watt for each solenoid. During a deflate function, when all the valves are open the power draw for the valves would be approximately 10 watts. The total power consumption of the system could thus vary between 16 watts and 82 watts, depending upon the type of pump used to inflate the cells. Thus, the invention contemplates one order of magnitude power consumption variance. Thus, the invention, in one aspect, has a power consumption variance of one order of magnitude.

In vehicular applications such power consumption can overload existing wiring harness configurations and thus require larger capacity electrical systems and can generate excessive electrical noise and thus require additional components to reduce. Larger capacity electrical systems and noise reduction components add additional cost and weight to the vehicle.

The low power valves in the present invention draw microwatts of power for each operational valve when energized and, in a typical active surface during the maximum power draw for all valves in an exhaust mode, a total less than 1 milliwatt. Such power draw or less occurs during the valve control states established by the various programmable modes of the microcomputer, to be described following in greater detail. The low energy consumption valves in the present invention allow the initial inflate process in which the pump and all valves (but the exhaust valve) are energized to allow pressure flow to the various air cells of the system at very low power requirement levels.

The importance of this aspect of the active surface control system of the present invention is best understood in battery powered applications where power consumption is a rigid design constraint. The orders of magnitude decrease in valve power consumption provided by the present invention becomes a significant, and heretofore unrecognized advantage since a smaller power source can be used for lower cost and reduced weight; fewer modifications to wiring harness designs in vehicular operations are required and less heat is generated in systems where heat build up can be disadvantageous as for example in space shuttle and other vehicular operations where the system is used in a controlled environment.

The fact that the valves further have a high flow rate capability is important in applications where the air cell volume is relatively large, e.g., in hospital bed applications or in which the operation of the system is required to be non-subtle, e.g., pressure adjustments in the cell are made rapidly. In such applications the large flow rate is especially advantageous. However, in all applications, the flow rate will directly impact system energy dissipation. The activation time (time required for the system to reach a desired programmed target) will depend upon the flow rate of the valves, pump flow rate capacity, and volume of the target air cell(s). If the flow rate of an individual valve is low, more time will be required to achieve the target, a pump will be required to run for a longer period of time in which its power consumption over greater time will produce greater energy dissipation. Another disadvantage of such prior art lower flow rate valves is that they are pneumatically lossy since pressure drop across the valves will be higher and usable pressure at the outlet of the valve will be less.

Figure 3:
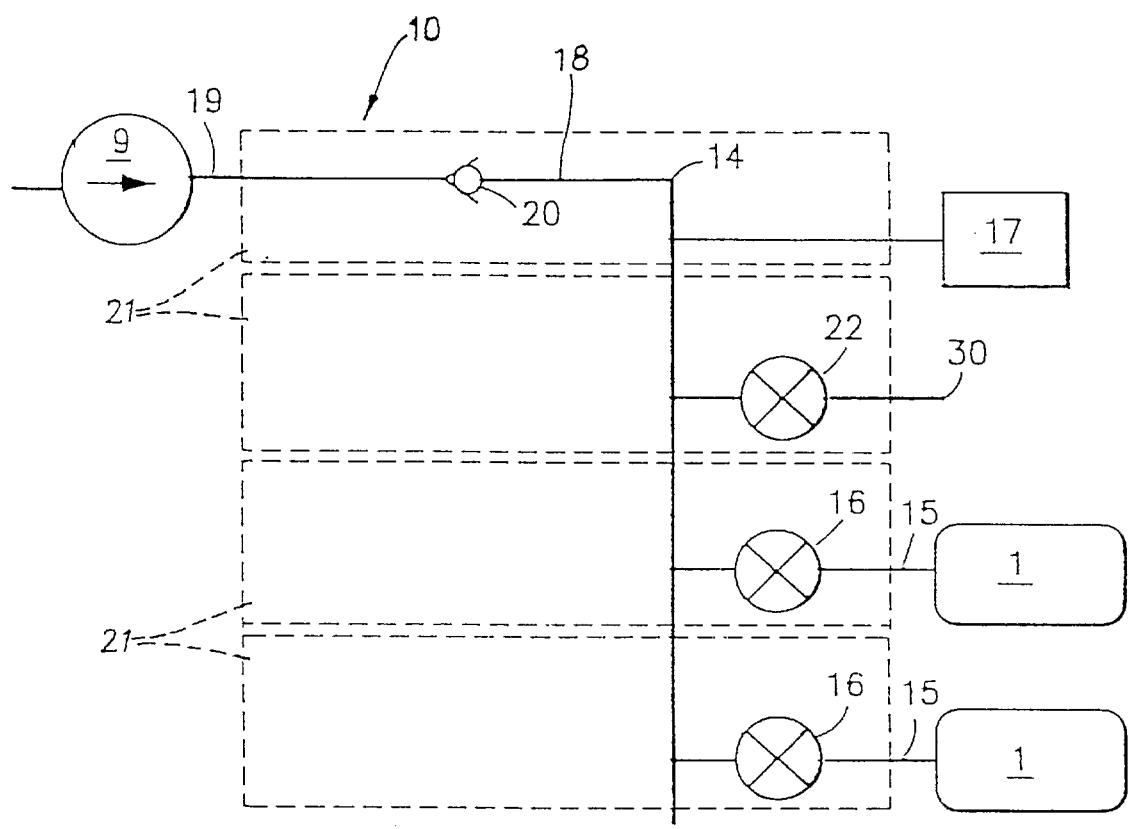
FIG. 3 is a schematic diagram of the manifold of this invention.
Figure 5:
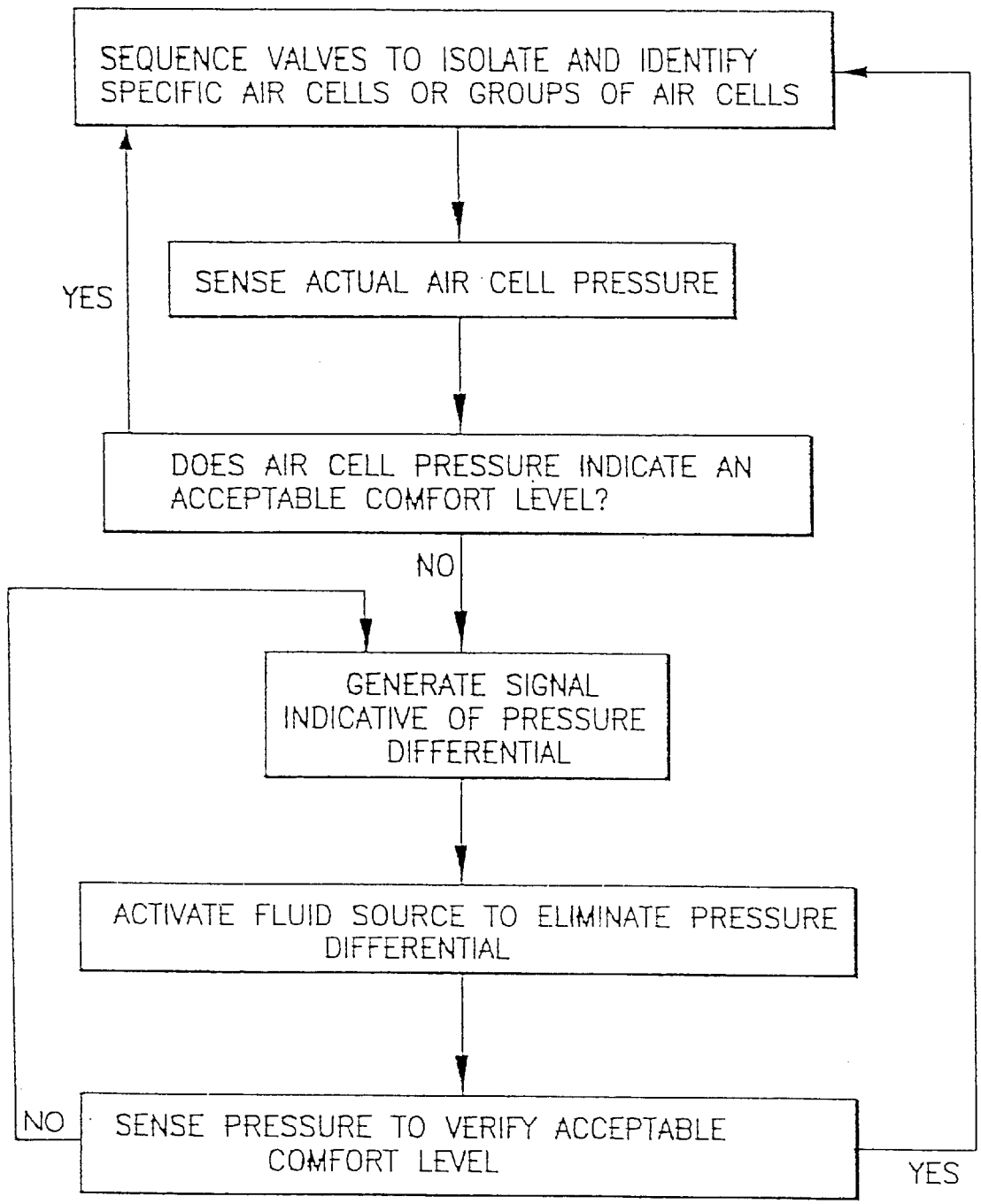
FIG. 5 is a flow chart illustrating the steps of the method of this invention.

The manifold 10 is shown in FIG. 3 as a stack of integrally molded valve bodies 21 enclosing a common interior chamber 14 which communicates with a plurality of output ports 15 through output valves 16. Although only two ports 15 are shown, it should be clear that this number is only limited by the size of the space allocated for each particular application.

The Control

The active parts of the system of this invention namely: the outlet valves 16, the transducer 17, pump 9, as well as bleed valve 22 and supply valve 20 are interconnected electrically to a microcomputer unit 21 which controls the operation of the system. The MPU 21 can be a commercially available microcomputer such as the 68HCO5 variant manufactured by Motorola. A microcomputer as used herein includes all subsystems and peripheral components as is well known to those skilled in the art.

The MPU 21 has access to non-volatile memory which has been programmed to provide a predetermined comfort standard such as the algorithm described in U.S. Pat. No. 5,283,735. These data can be compiled and coded for use with individual air cells or regions of air cells. Data sensed by transducer 17 is compared to the comfort standard and an actuation signal is generated which actuates the system to compensate for any differential between the programmed comfort level and the sensor generated data.

In order to operate each cell or group of cells independently to provide an extensively adjustable system, the MPU 21 must also be programmed to actuate the output valves 16 to isolate a selected air cell or group of air cells in communication with the manifold. The actuation is controlled in closed loop fashion to allow the pressure in the chamber 14 to equalize with the pressure in the air cell or cells with which it is communicating. On an instantaneous basis there is a closed system among the connected air cell(s), the feed tube, the chamber 14, and the fluid supply thereby allowing the sensor to provide data from the closed system and to provide adjustment of the pressure in the isolated air cell(s) by the MPU 21 to the desired comfort or pressure level.

Operation

Figure 6:
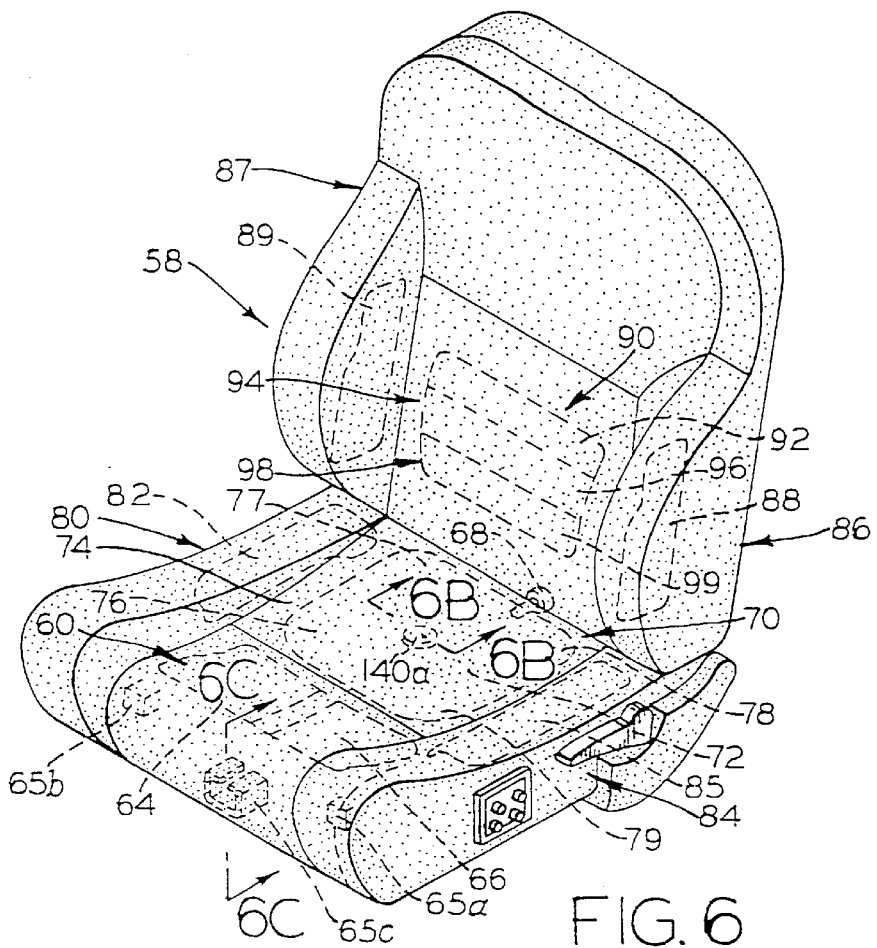
FIG. 6 is a perspective view of an automotive seat showing a second embodiment of the invention for adjusting the position of air cells therein.

The operation of the invention will be understood to have application to either the embodiment of FIG. 2 or the embodiments shown in FIG. 6 and in FIG. 7 with it being understood that the operation of the target pressure control variants to be described herein apply equally well to systems in which the air cells can be independently positioned or remain in a predetermined position on a support surface of a vehicle seat or the like.

In operation, the MPU 21 will open a valve 16 interconnecting a selected air cell or air cell group, such as the lumbar region cells 4, with the manifold chamber 14 and allow the pressure in the selected system to settle out. The time to let pressure equalize is "pressure settling time". After the settling time, the pressure is sensed and a signal is sent to the MPU 21 for comparison with the preprogrammed comfort data. The MPU 21 then generates a signal relative to the difference in the comfort level sensed to the programmed comfort level and initiates a flow of fluid to or from the selected cell system to reduce the difference to zero. This sequence of operations is then repeated "n" times until each of the air cell systems are sensed and adjusted.

Alternative Embodiments

The device and method of this invention may be simplified by using a preset pressure as the programmed comfort level and allowing the system to poll each air cell system and adjust the pressure in each air cell to the preset pressure. In addition the operator could be allowed to adjust the pressure level in accordance with his or her own perceived comfort. Also the instantaneous data may be sensed by an array of force sensors as described in U.S. Pat. No. 5,283,735 in the place of the transducer 17. In the latter instance the sequencing would remain the same, but it would be coordinated with a polling of the sensor array. It is observed that by varying the comparative comfort data and the number and location of the air cells, the system of this invention allows for a wide variety of comfort styles and an almost infinite flexibility of adjustment in a package that is simple, light weight, low cost and efficient.

In the embodiment of the invention shown in FIG. 6, a vehicle seat 58 suitable for use in a motor vehicle application is illustrated that includes ten (10) air cells and eight (8) air zones. In this embodiment a first air zone 60 includes a moveable seat pan 62 with thigh air cells 64, 66. The seat pan 62 is extendible and retractable on a suitable track system 65 that can include laterally spaced side rails 65a, 65b or single center track 65c with side guide surfaces on each side of the seat pan 62. The seat pan 62 is driven on the track system by suitable actuators such as a motor driven ball screw actuator 68 that can be substituted by a pneumatic cylinder or other electrical, mechanical or pneumatic actuator that will connect to a seat pan support member 66a for positioning it fore and aft with respect to the side rail or support systems.

A second air zone 70 is defined by an ischial air cell 72 on a fixed seat portion 74. The ischial air cell 72 has a generally butterfly shaped configuration with a center region 74a and four wing regions 76, 77, 78, 79. The air zone 70 is controlled such that the pressure acting on the posterior of a user will be in a range that will not unduly restrict capillary blood flow.

A third air zone 80 is defined by a right pan bolster air cell 82 located laterally outboard and above the air zone 70. A fourth air zone 84 is the left counterpart of the air cell 82 and is defined by a left pan bolster air cell 85 located laterally outboard and above the air zone 70 opposite to the air cell 82 such that the occupant is provided good lateral pressure support as desired.

Fifth and sixth air zones 86, 87 are defined by a pair of seat back bolster air cells 88, 89 located in side arm regions of the vehicle seat 58.

A seventh air zone 90 is defined by a top lumbar air cell 92; an eighth air zone 94 is defined by a middle lumbar air cell 96 and a ninth air zone 98 is defined by a bottom lumbar air cell 99. The design and placement of air zones and air cell or cells within the air zones is determined by the particular application to which the occupant support pertains. In the illustrated arrangement, both pairs of the bolsters provide support, and depending on the seat or chair design, can produce a holding action on the occupant within the confines of the seat. The ischial cell 72 is designed so as to distribute pressure in a manner to reduce pressure points that can unduly restrict capillary blood flow. The lumbar cells 92, 96, 99 provide support at the spinal regions of the occupant and depending upon the level of inflation in each of the lumbar cells can be configured to ensure that lumbar lordosis is preserved.

In FIG. 7 a fluid distribution system is shown for controlling the zones described in the seat 58 illustrated in FIG. 6. In this arrangement, a fluid control system 100 is provided having a microcomputer 102 operatively connected to a pump drive 104 for driving a pump 106 having its discharge connected through a check valve 108 to a manifold 110 comprised of a plurality of stacked low energy consumption, low flow resistance, e.g., high volume flow type valves 110a–110h, each having an inlet connected to the manifold 110 and each having an outlet connected to one of the air zones in the fluid distribution system. The manifold 110 is also connected to a single exhaust valve 112. In this embodiment a valve drive control 114 is connected to an output from the microcomputer 102 to selectively condition one or more of the valves 110a–110h to be connected to the manifold 110 in accordance with a programmed control sequence to be discussed. Additionally, each of the air zones has the pressure condition therein independently processed by an MUX or analog multiplexer 116 that directs a pressure signal selectively from a separate pressure sensor 116a–116h located between each of the valves 110a–110h and a respective one of the air zones shown in the seat 58 of FIG. 6. Since the pressure signals are processed by the MUX 116 only a single analog to digital port 116a on the microcomputer 102 is required for pressure sensing.

Additionally, the fluid distribution system in FIG. 7 includes an independently operable user switch 118 for overriding automatic programmed control sequences. The automatic programmed control sequences are modified not only by the pressure signals inputted by the MUX 116 to the microcomputer 102 but they are also controlled in response to additional signals from a temperature sensor 120, an occupant sensor 122, and other sensors that will be discussed.

Figure 6B:
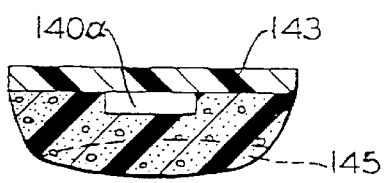
FIG. 6B is an enlarged fragmentary sectional view taken along the line 6B—6B of FIG. 6 looking in the direction of the arrows.
Figure 6C:
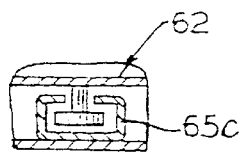
FIG. 6C is an enlarged fragmentary sectional view taken along the line 6C—6C of FIG. 6 looking in the direction of the arrows.
Figure 6A:
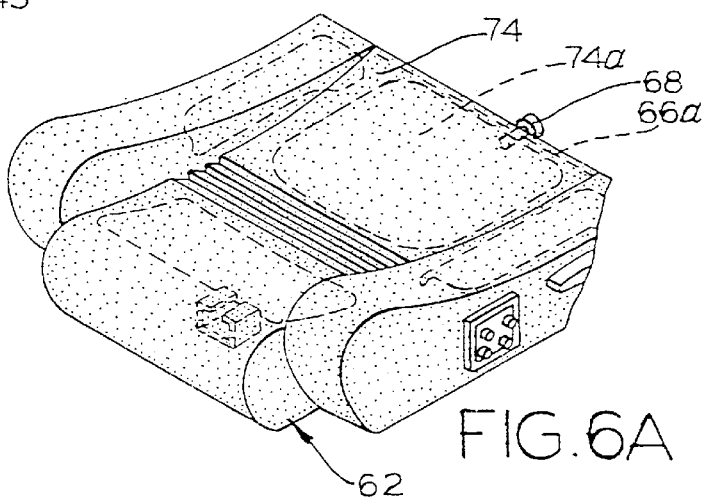
FIG. 6A is a view like FIG. 6 showing a thigh support air cell in an extended position.

Another embodiment of the invention is shown in FIG. 8 as a fluid distribution system 124 controlled by a control system 126 having a microcomputer 128 similar to that previously discussed. In this embodiment, air zones are provided similar to those in the seat 58 shown in FIG. 6 and they are connected to a manifold 130 through low energy consumption, low flow resistance, e.g., high volume flow valves 130a–130h like those discussed in the previous embodiments. In this embodiment, the manifold 130 is connected to a suitable pressure fluid source comprised of a pump drive 132 such as a power transistor (not shown) controlled by the microcomputer 128. Drive 132 receives an operating signal from the microcomputer 128 so as to enable an electric motor 133 to be energized by a pulse width modulated power supply from the drive 132 that will control the flow rate from a fluid pump 134 for reasons to be discussed. The control system 126 further includes a valve drive 136 that opens and closes the high volume flow valves 130a–130h to the manifold 130 pressure when the pump 134 is operating or, alternatively, will connect the respective valves 130a–130h and the air cells within the respective air zones to exhaust through a single exhaust valve 138 when the pump 134 is turned off such that the individual air cells within the respective air zones can be decremented (deflated) or incremented (inflated) in pressure if desired to meet a desired preprogrammed or user override surface condition that will actively control the surface to provide a desired contouring, movement support and or comfort as desired so as to selectively control the surfaces of the air cells in each of the respective zones. A single pressure transducer or sensor 139 connects to the manifold 130 upstream of exhaust valve 138 for determining the pressure in the respective air zones when the exhaust valve 138 is closed and the flow valves 130a–130h are open in accordance with the program of microcomputer 128. In this embodiment of the invention, the microcomputer 128 is also associated with a plurality of sense cells 140a–140i, one of which is embedded in each of the air cells in the seat 58 of FIG. 6. The sense cells can be variable resistance sensors, capacitive sensors or the like that will produce an appropriate output signal to be processed by the microcomputer 128 when flexed or compressed. The sense cells are embedded in the surface of each of the cells as shown in FIG. 6B where a fragmentary sectional view is shown including a seat cover portion 143 covering an air cell 145 and wherein a force sensing array of the type sold by Vistamed is adhered to the air cell 145 or alternatively embedded in the seat cover portion 143 or alternatively is disposed within the interior of the air cell at a point where it will detect changes in the shape of the air cell produced by user movements thereacross so as to automatically adjust the pressure within the cell in accordance with a programmable sequence to be described. The sense cells 140a–140i are connected to an analog multiplexer 142 for directing sense cells signals to a single port 144 on microcomputer 128. Switches common to those in FIG. 8 are designated with the same numeral primed.

In one aspect of the invention, the pressure transducers can be used for monitoring pressure in selected cells for changes in pressure related to occupant movement and the microcomputer can compare such readings against programmed comfort values to establish a rate of change and the microcomputer can be programmed to produce output signals for compensating for such occupant wiggling movements by controlling the valves to adjust the system in response to such signature to recycle the system to assure that initial target pressures are present therein.

Figure 9:
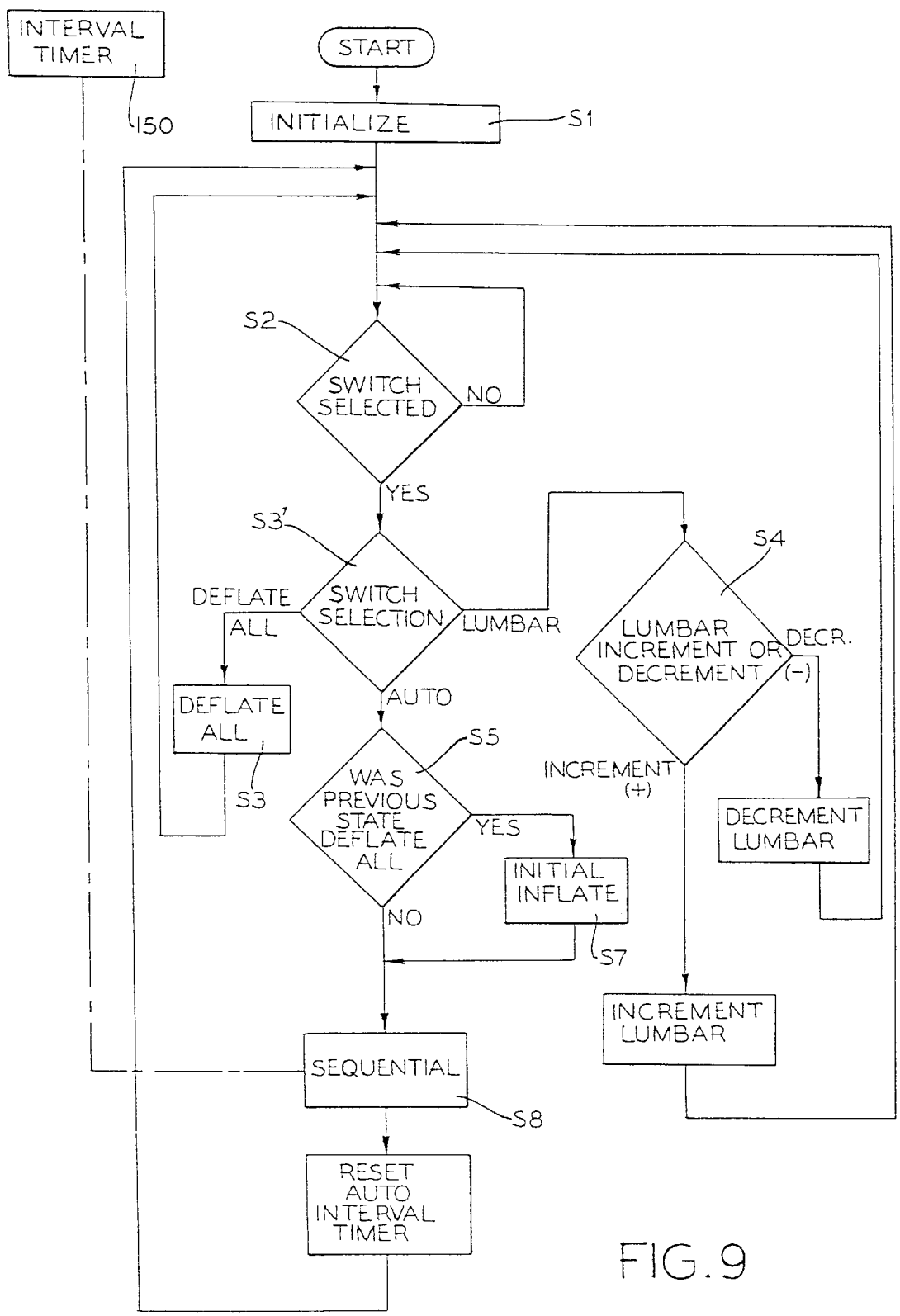
FIG. 9 is a flow chart for controlling the fluid distribution systems of the present invention.

The flow chart shown in FIG. 9 is a high level flow chart of one suitable program sequence for control of the embodiments previously described at FIGS. 1–8. At step S1 initialization determines if a vehicle ignition switch sensor 146 is on; if no the program ends; if yes, the program proceeds to step S2 where various switch selection modes are determined; if no the program repeats. If yes, (at step S2') meaning that one of a plurality of switch operations is initiated, the program proceeds to either of the steps S3, S4 or S5.

Switch selection indicated at the control steps S3, S4 or S5 includes the operator selecting an on-off switch 118, 118' or a lumbar deflate or inflate switch 148, 148'. The step S5 is an automatic step that occurs if a temperature limit switch sensor 120, 1201 and an occupant switch sensor 122, 122' are properly set and one of the switches 118, 118' (on) is selected.

If the power off switch 118, 118' is operated or if an occupant seat switch sensor 122, 1221 detects that there is no occupant or if a temperature sensor switch 122, 122' detects an elevated temperature that can cause the various air cells to be overpressured, the program proceeds to step S3 "deflate all". At step S3 the microcomputer outputs a deflate signal to the low energy high flow valves between the air cells and the manifold causing them to open; a deflate signal to the exhaust valve causing it to open and a deflate signal to the pump drive turning it and the pump motor off. This causes all of the air cells to simultaneously deflate to atmospheric pressure. Thus the microcomputer under all or some of such conditions produces a "deflate trigger"; in the case of the occupant sensor the deflate trigger occurs, for example, when a desired sensor signature indicating the presence of an occupant or a seat pattern such as produced by packages and the like, and if the signal pattern differs from an acceptable signature, the microcomputer will produce an occupant "deflate trigger" output; in the case of the temperature sensor signal, the microcomputer will compare the actual temperature signal to a preprogrammed temperature value and if such comparison indicates that the cell or cells can be overpressurized a temperature induced deflate trigger occurs thus producing a third "deflate trigger". Such deflate triggers from the microcomputer cause the valve drive to condition all of the individual supply valves to open simultaneously while at the same time opening the single exhaust valve from the manifold. Thus, the program will produce a simultaneous deflation of all of the air cells by opening the valves 16 in the FIG. 3 embodiment; or by opening the valves 110a–110d in the FIG. 8 embodiment or by opening the valves 130a–130h in the embodiment of FIG. 9 as well as their associated exhaust valves.

Following the deflation of each of the air cells in the respective seating systems, the bolster air cells will be reduced in size allowing for easier egress from the vehicle. Following the deflate all at step S3, the control sequence is returned to the switch selected step S2.

The flow chart shown in FIG. 9 also includes a lumbar adjustment mode at step S4 in which the lumbar switch 148, 148' is positioned to inflate or deflate. In this mode, inflation or deflation is performed in a continuous manner as opposed to an incremental one. When the lumbar switch 148, 148' is positioned to inflate, the microcomputer reads this signal, opens the appropriate valve(s) and turns the pump on. Pressure is read continuously. When either the switch is released or the maximum preset lumbar pressure is reached, the microcomputer turns off the pump, waits for pressure to settle, reads the new lumbar pressure and closes the valves. When the lumbar switch 148, 148' is positioned to deflate, the microcomputer reads this signal, opens the appropriate valve(s) and the exhaust valves. The system remains in this state until the switch is released. Once the switch is released, the microcomputer closes the exhaust valve, waits for the pressure to settle and reads the new lumbar pressure. In both cases, the new lumbar pressure is stored in the target pressure look-up table and remains until the lumbar function is reactivated or power is removed.

Thus, the new desired lumbar pressures can be established in accordance with whether a user selected deflation or inflation of the original lumbar pressure for comfort or as established by user juries or other standards for comfort. In either case, the comparison pressures for lumbar comfort are programmed in accordance with the desires of a user and remain in place until the control system is turned off, at which time the originally selected base line pressures for user comfort are used as a standard for carrying out a sequential control to be discussed.

At control step S5, an automatic pressure control sequence is established that proceeds to step S7 if the previous state is "deflate all"; at step S7 an initial inflate step occurs wherein the microcomputer transmits valve signals to open all valves except the exhaust valve; the pump is actuated until all the air cells are pressurized during which the pressure is sensed in common while air is flowing and the valves are closed as a target pressure plus over target pressure $\epsilon$ is reached for each zone.

At control step S8, the microcomputer provides a sequential adjust that is initiated by an interval timer 150. The sequential adjust is operated following initial inflate mode of operation or at any autocycling not following a deflate all or system power up. In the sequential adjust mode, the pressures in each of the cells (or zones) are read and adjusted one zone at a time.

In the sequential adjust, the microcomputer is programmed such that it will initiate a control sequence in which a "pressure read" is initiated by first determining if the exhaust valve is open or if the pump is operating. These conditions will be detected and if present the controller will initiate a sequence to close the exhaust valve and to shut off the pump motor.

A pressure read consists of closing the exhaust valve or bleed if it is open or turning the pump off if it is on, opening the valve to the target zone, waiting for the pressure to settle then reading the pressure in the common. The pressure read sequence applies to the single sensor embodiment shown in FIG. 8. In the multiple sensor embodiment shown in FIG. 7, the valves do not change state for a pressure read since the pressure sensing is done at the output or air cell side of the valves.

The pump on-time, in the case of inflate, or the bleed valve open-time, in the case of deflate, are modulated proportional to the difference between the read pressure and the target pressure. Inflate/deflate factors are used to compensate for pressure read errors while air is flowing. Using an electrical analog, pressure is viewed as voltage, flow as current and pneumatic impedance as electrical impedance. The effective IR drop between the pressure transducer(s) and the air cell is determined empirically and is the compensation factor used during inflates. In the case of deflation, the compensation factor is the effective IR drop between the pressure transducer(s) and atmosphere. Continuing the electrical analogy, IR corresponds to flow times impedance which is pressure. When the read pressure approaches the target pressure, the bleed valve open time is determined by the minimum valve open time.

A delay period is initiated to stabilize the pressure in the manifold (only in the single sensor embodiment of FIG. 8).

The sequential adjust for each cell or cell zone is as follows:

1. Enter sequential mode.
2. Read pressure in selected cell.
3. Compare read pressure to target pressure.
4. If read pressure too low initiate inflate; if too high initiate deflate.
   If inflate:
   A. Open valve.
   B. Turn pump on for time calculated in accordance with the difference in pressure between the target pressure and the read pressure.
   C. Close valve and allow pressure to settle.
   D. Read pressure.
   E. Compare read pressure to target pressure minus pressure $\epsilon$.
   F. Repeat steps B through E until target pressure minus pressure $\epsilon$ is achieved.
   If deflate:
   A. Open valve.
   B. Open bleed valve for calculated time.
   C. Read pressure.
   D. Compare read pressure to target pressure plus pressure $\epsilon$.
   E. Prepare steps B through D until target pressure plus pressure $\epsilon$ is achieved.
5. Repeat 2 through 4 until all zones are at target pressure.
6. Repeat 1 through 5 until all zones are at target without adjustment or following a predetermined number of cycles of steps 1–5 to avoid hunting.

FURTHER CONSIDERATIONS

While switch initiation of the control is discussed at S1, S2, S3, S4 or S5, system activation can be preprogrammed if desired and system activation could range from a microcomputer with no peripheral switches to more than four switches, as desired. For example, the microcomputer could be programmed so that the use of a keypad ;or keyfob entry system with a seat memory 1 or seat memory 2 could initiate a preprogrammed sequence to control the cell pressures to meet the desires of two different users. In such case, the peripheral switches 118, 118' described in the embodiments of FIGS. 8 and 9 are not required.

Further, at S3, as currently implemented, temperature sensing is used to protect temperature sensitive system components (valves, pump). If the sensed temperature is out of range (too hot or too cold), the microcomputer opens all of the valves (deflate all) and goes to a safe state. In the safe state, the microcomputer monitors temperature and prevents system operation until temperature returns to the active region.

With the temperature sense capability, the microcomputer could be programmed to compensate for temperature dependent pressure changes in the air cells of the apparatus for adjusting the contour of a seat.

Still further, at S3, or at another control point, an occupant movement monitoring algorithm can be employed to prevent the system from adjusting during movement. A possible sequence is as follows. The system is monitored for occupant movement. If movement is detected, the system waits until the movement (wiggling) stops then initiates an adjustment. If movement is not detected, the system continues to monitor but does not trigger an adjustment.

Still further, at step S4, alternatively, the lumbar adjust mode can operate the lumbar switches 148, 148' to inflate or deflate. Either switch operation can direct an incremental step signal that is processed by the microprocessor as for example by selecting a value of an originally inputted target pressure and adding a desired incremental value to each of the target pressures and outputting a modified target value into a second look-up table or register in the microcomputer that will be utilized at control step S4 during subsequent control operations to be described. These modified lumbar values remain in place until the microcomputer control ends, at which time the originally selected target pressures will be reestablished as the desired predetermined pressure condition in each pressure zone for obtaining the predetermined comfort level for seating.

In another configuration, a reversible pump can be connected to the common manifold through a blocking valve. The dedicated exhaust or bleed valve is eliminated. Inflates occur as in the other embodiments except that the blocking valve must be opened when the pump is on. Deflates are now active rather than passive. In this case, the pump is energized in the reverse direction so that it pulls air from the air cells through the commanded open (by the microcomputer) blocking valve. In this mode, the cells deflate more rapidly and can be completely deflated without external pressure being applied to them. The advantages of this mode are faster and more complete deflation.

While the best modes for carrying out the invention have been described herein in detail, those familiar with the art to which this invention pertains will recognize various alternative designs and embodiments for practicing the invention are possible within the scope of the following claims.

We claim:

1. An apparatus for adjusting the contour of a seat by pneumatically controlling the comfort of the seat comprising:
   a. a plurality of inflatable air cells mounted in operative association with a seat contour;
   b. a distribution system providing independent passages connected to each of the air cells;
   c. a manifold connected to each passage of the distribution system through an individual output valve actuated by an electrical signal;
   d. a source of pressurized fluid activated by an electrical signal and connected to the fluid distribution system through the manifold;
   e. one or more pressure transducer(s) for sensing the pressure within said air cells when each of said individual output valves is actuated so as to communicate each of said air cells with said manifold; said one or more pressure transducer(s) generating a pressure signal indicating the pressure within each of the air cells; and
   f. a microcomputer including an analog to digital converter; said microcomputer connected to transmit an actuation signal to each of the manifold valves; to receive the signal from said one or more pressure transducer(s) via said analog to digital converter and to transmit an activation signal to the source of pressurized fluid in accordance with the signal from said pressure transducer; said microcomputer being programmed to store data including a desired pressure to be maintained in each of said air cells; to transmit actuation signals to each of the manifold valves; to compare said force signal to the predetermined data; to generate a valve activation signal relative to the comparison between said pressure signal and said comfort data and further programmed to transmit said activation signal to the source of pressurized fluid to adjust the pressure in each air cell to the desired pressure in each of said air cells the improvement comprising:
   said computer being provided with comfort data established by measuring the of a seat in accordance with the pressure distribution thereon;
   a vehicle ignition state monitor; said microcomputer responsive to said ignition state monitor to produce a deflate all signal at the beginning of a control cycle; said deflate all signal being directed to said computer and said computer being programmed so as to be operative to condition all of said valves to open to simultaneously produce atmospheric pressure within all of said air cells prior to any comparison of said pressure signals with said predetermined comfort data established by measuring the comfort of a seat in accordance with the pressure distribution thereon.

2. Apparatus for adjusting the contour of a seat by pneumatically controlling the comfort of a seat as set forth in claim 1 further comprising a temperature monitor and said microcomputer responsive to either said temperature monitor and said vehicle ignition state monitor for producing said deflate all signal.

3. Apparatus for adjusting the contour of a seat by pneumatically controlling the comfort of a seat as set forth in claim 1 further comprising an occupant seat sensor and said microcomputer responsive to either said occupant seat sensor and said vehicle ignition state monitor for producing said deflate all signal.

4. Apparatus for adjusting the contour of a seat by pneumatically controlling the comfort of a seat as described in claim 1 wherein the pressure transducer is a single transducer operatively associated with the manifold to generate a signal indicative of the pressure in the manifold.

5. Apparatus for adjusting the contour of a seat by pneumatically controlling the comfort of a seat as described in claim 1 wherein said pressure transducer conditions said microcomputer and said microcomputer is programmed to be responsive to such conditioning so as to be operative to produce a valve control signal that will automatically exhaust or fill an air cell to correct for pressure changes produced by occupant movement, temperature variation or to compensate for small leaks in order to maintain a desired target pressure within one or more of the air cells in a comfort controlled seating system.

6. Apparatus for adjusting the contour of a seat by pneumatically controlling the comfort of a seat as described in claim 1 wherein the air cells are arranged in regional groups and the distribution system provides independent passages to connect each of the groups of air cells and wherein said microcomputer is programmed so as to be operative to isolate each of said groups as the pressure therein reaches its target pressure.

7. Apparatus for adjusting the contour of a seat by pneumatically controlling the comfort of a seat as described in claim 6 further including a regional group of cells at a lumbar region; a lumbar switch with an inflation and a deflation mode of operation for controlling pressure increase or decrease in said regional lumbar group and said microcomputer programmed so as to be operative to provide a selective control of said pump and said valves to provide an adjustment of the pressure in one or more of the cells in said lumbar region independently of pressures sensed by the transducer and further operative to utilize the adjustment to simultaneously up-date the comfort data by changing a target pressure for one or more of the cells in said lumbar region.

8. Apparatus for adjusting the contour of a seat by pneumatically controlling the comfort of a seat as described in claim 1 further including a pump motor and a pump motor drive for providing the source of pressurized fluid; said microcomputer programmed so as be operative to control said motor drive to produce energization of said drive motor as a pulse width modulation of the drive motor for controlling said source of pressurized fluid and wherein the duty cycle of energization of said drive motor is regulated in accordance with the number of open control valves.

9. Apparatus for adjusting the contour of a seat by pneumatically controlling the comfort of a seat to increase the comfort of the user as described in claim 1 wherein the manifold output valve comprises a valve element actuator that draws low power and has a high flow.

10. Apparatus for adjusting the contour of a seat by pneumatically controlling the comfort of a seat to increase the comfort of the user as described in claim 9 wherein the low power, high flow, manifold output valve includes a piezoelectric actuator element.

11. Apparatus for adjusting the contour of a seat by pneumatically controlling the comfort of a seat to increase the comfort of the user as described in claim 1 further comprising a bleed port communicating with the manifold and a bleed valve operatively associated with the bleed port to control the flow of fluid therefrom, said bleed valve being actuatable by a signal from the microcomputer to allow the selective release of fluid from the manifold.

12. Apparatus for adjusting the contour of a seat by pneumatically controlling the comfort of a seat to increase the comfort of the user as described in claim 1 further comprising an occupant seat monitor and microcomputer control system that is operable to detect a signature of occupant movement produced by wiggling movements of an occupant sensed by said occupant seat monitor and is programmed to produce output signals for controlling said valves to adjust the system in response to such signature to recycle the system to assure that initial target pressures are present therein.

13. Apparatus for adjusting the contour of a seat by pneumatically controlling the comfort of a seat to increase the comfort of the user as described in claim 1 wherein the actuation of the manifold output valves selectively isolates specific air cells with the manifold and wherein the sequential control of each of said air cells is either by a pressure pump inflation or by an exhaust valve deflation.

14. Apparatus for adjusting the contour of a seat by pneumatically controlling the comfort of a seat to increase the comfort of the user as described in claim 13 wherein said microcomputer is programmed so as to provide said pressure pump inflation or said exhaust valve deflation by establishing a pressure $\epsilon$ range for the target pressure and is operative to conduct only a select number of trial adjustments before terminating a correction sequence for establishing a desired target pressure condition within said air cells.

15. Apparatus for adjusting the contour of a seat by pneumatically controlling the comfort of a seat to increase the comfort of the user as described in claim 6, a timer operative so as to cause isolation of each of the groups of air cells to be timed to allow settling of the pressure in the manifold.

16. Apparatus for adjusting the contour of a seat by pneumatically controlling the comfort of a seat to increase the comfort of the user as described in claim 6 wherein the sensor is operatively associated with the manifold to generate a signal indicative of the pressure in the manifold during such isolation.

17. Apparatus for adjusting the contour of a seat by pneumatically controlling the comfort of a seat to increase the comfort of the user as described in claim 1 further including a moveable seat pan and pressure controlled air cells on said seat pan; said seat pan having fore and aft adjustment and a motor controlled by said microcomputer operative to control the seat pan position in accordance with pressures produced in said pressure controlled air cells on said seat pan.

18. Apparatus for adjusting the contour of a seat by pneumatically controlling the comfort of a seat to increase the comfort of the user as described in claim 1 wherein the air cells are arranged in regional groups and the distribution system provides independent passages to connect each of the groups of air cells and wherein said system further includes a moveable seat pan and pressure controlled air cells on said seat pan; said seat pan having fore and aft adjustment and a motor controlled by said microcomputer operative to control the seat pan position in accordance with pressures produced in said pressure controlled air cells on said seat pan.

19. Apparatus for adjusting the contour of a seat by pneumatically controlling the comfort of a seat as set-forth in claim 1 further comprising multiple pressure transducers and each of said multiple pressure transducer being operatively associated with one of said plurality of air cells to generate a signal indicative of the pressure in said one of said plurality of air cells.

20. Apparatus for adjusting the contour of a seat by pneumatically controlling the comfort of a seat as set-forth in claim 2 further comprising multiple pressure transducers and each of said multiple pressure transducers being operatively associated with one of said plurality of air cells to generate a signal indicative of the pressure in said one of said plurality of air cells.

21. Apparatus for adjusting the contour of a seat by pneumatically controlling the comfort of a seat as set-forth in claim 3 further comprising multiple pressure transducers and each of said multiple pressure transducers being operatively associated with one of said plurality of air cells to generate a signal indicative of the pressure in said one of said plurality of air cells.

22. Apparatus for adjusting the contour of a seat by pneumatically controlling the comfort of a seat as set-forth in claim 5 further comprising multiple pressure transducers and each of said multiple pressure transducers being operatively associated with one of said plurality of air cells to generate a signal indicative of the pressure in said one of said plurality of air cells.

23. Apparatus for adjusting the contour of a seat by pneumatically controlling the comfort of a seat as set-forth in claim 6 further comprising multiple pressure transducers and each of said multiple pressure transducers being operatively associated with one of said plurality of air cells to generate a signal indicative of the pressure in said one of said plurality of air cells.

24. Apparatus for adjusting the contour of a seat by pneumatically controlling the comfort of a seat as set-forth in claim 7 further comprising multiple pressure transducers and each of said multiple pressure transducers being operatively associated with one of said plurality of air cells to generate a signal indicative of the pressure in said one of said plurality of air cells.

25. Apparatus for adjusting the contour of a seat by pneumatically controlling the comfort of a seat as set-forth in claim 1 including at least one of a motor driven mirror; a motor driven operating pedal and a motor driven steering wheel; a occupant assessor including an input to said microcontroller for adjusting the position of one of said motor driven mirror; said motor driven operating pedal and said motor driven steering wheel.

* * * * *